United States Patent [19]

Ingensand

[11] Patent Number: 5,077,557
[45] Date of Patent: Dec. 31, 1991

[54] SURVEYING INSTRUMENT WITH RECEIVER FOR SATELLITE POSITION-MEASURING SYSTEM AND METHOD OF OPERATION

[75] Inventor: Hilmar Ingensand, Widnau, Switzerland

[73] Assignee: Wild Leitz AG, Heerbrugg, Switzerland

[21] Appl. No.: 460,914
[22] PCT Filed: Jun. 20, 1989
[86] PCT No.: PCT/EP89/00690
§ 371 Date: Feb. 15, 1990
§ 102(e) Date: Feb. 15, 1990
[87] PCT Pub. No.: WO90/00718
PCT Pub. Date: Jan. 25, 1990

[30] Foreign Application Priority Data

Jul. 6, 1988 [CH] Switzerland ............... 02569/88

[51] Int. Cl.⁵ ............... G01S 13/00; H04B 7/185; G01C 3/00; G01C 3/08
[52] U.S. Cl. .................. 342/52; 342/54; 342/56; 342/58; 342/352; 342/357; 356/1; 356/4; 356/5
[58] Field of Search ............ 356/1, 4, 5; 342/52, 342/54, 56, 58, 352, 357; 364/452

[56] References Cited
U.S. PATENT DOCUMENTS 4,615,617 10/1986 Frank et al. .................. 356/5
4,620,788 11/1986 Giger ......................... 356/5
4,741,245 5/1988 Malone ..................... 342/357 X
4,743,913 5/1988 Takai ........................ 342/457
4,949,089 8/1990 Ruszkowski, Jr. ............ 342/52

OTHER PUBLICATIONS

Stiglitz, "The Global Positioning System," Microwave Journal, vol. 29, No. 4, Apr. 1986, pp. 34, 36, 38, 42, 44, 46, 50, 52, 54, 56–59.
Gort, "A Fully Integrated, Microprocessor-Controlled Total Station," Hewlett-Packard Journal, vol. 31, No. 9, Sep. 1980, pp. 3–11.

Primary Examiner—Stephen C. Buczinski
Attorney, Agent, or Firm—Foley & Lardner

[57] ABSTRACT

A surveying instrument for satellite position-measuring includes, a range finder (2), which is preferably non-contact-measuring and tiltable, combined with a satellite receiver (1) in a geometrically unambiguously defined relative position. These two instrument parts are mounted geometrically unambiguously in common plumb rod (3) or on a measurement stand. A vertical sensor (4) and a sighting device (5) are additionally provided, whereby simultaneous monitoring and setting respectively of the vertical direction and of the direction of the range finder measurement beam is permitted. Using the instrument, it is also possible to determine, in terms of coordinates, such points which formerly could not be surveyed using satellite position-measuring systems.

7 Claims, 2 Drawing Sheets

SURVEYING INSTRUMENT WITH RECEIVER FOR SATELLITE POSITION-MEASURING SYSTEM AND METHOD OF OPERATION

The invention relates to a surveying instrument with a receiver for a satellite-position measuring system as well as to a method of operation thereof.

Satellite position-measuring systems permit a terrestrial position determination with geodetic accuracy. A precondition is the use of a receiver tuned to the system, which in the case of field measurements is a mobile instrument. The receiver is directly equipped with an antenna, the position of which is recognized with the aid of the system. On account of the quasi-optical propagation properties of the wave range selected for the transmission system, a useful reception of the satellite signals can be guaranteed only if the receiver antenna is situated in the direct range of sight of a plurality of satellites of the system. This precondition is not fulfilled for all surveying tasks. Points which are masked by obstructions in the zenith region and which thus are not situated in the reception range of the satellites formerly could not be surveyed by this system.

The object of this invention also is to permit the surveying of points with the aid of a satellite system, which points are not situated in the direct range of sight of the satellites. According to the invention, this object is achieved by an instrument which includes a non-contact measuring range finder 2 which is tiltable combined with a satellite receiver 1 in a geometrically unambiguously defined relative position. A method according to the invention for the operation of the instrument involves a remote measuring point 6 which is aimed at with a sighting device 5 and a vertical setting of the instrument is simultaneously monitored with the aid of a vertical sensor 4.

By the measures defined therein, it becomes possible to determine in terms of coordinates also such points which could not be surveyed formerly by using satellite position-measuring systems. Thus, for example, field surveying is substantially simplified, since only instruments for surveying according to the satellite system must additionally be carried.

Details of the invention are explained in greater detail hereinbelow, with reference to illustrative embodiments, with the aid of the drawings. In the drawings.

Figure 1:
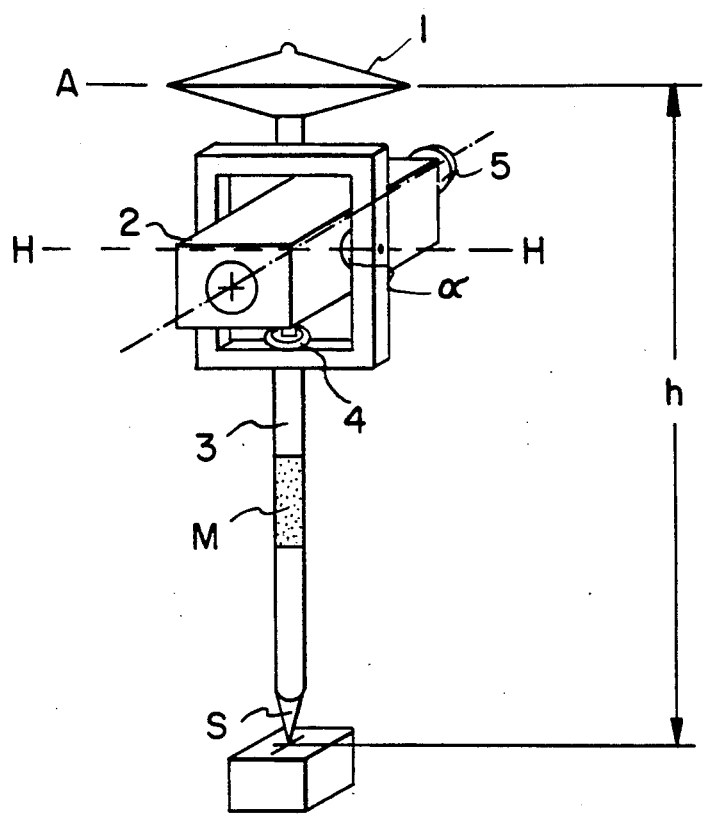
FIG. 1 shows an example of a surveying instrument for surveying of points which are not situated in the reception range of a satellite position-measuring system.

According to FIG. 1, a measuring instrument according to the invention consists of a receiver 1 tuned to the satellite position-measuring system, with an appropriate antenna. In the example, the receiver is preferably arranged for the reception of the Global Positioning System GPS. The instrument furthermore includes a range finder 2, preferably an electro-optical range finder or a range finder based on the ultrasonic principle. An electro-optical range finder is preferably of the type as described in Swiss Patent Specifications CH 641,308 or CH 644,243. The two mentioned modules receiver 1 and range finder 2 are mounted in a geometrically unambiguous manner on a plumb rod 3, which exhibits, as an additional device, a vertical sensor 4 for the determination of the local physical vertical direction.

The range finder 2 is provided with a sighting device 5, which is disposed coaxially to the optical axis of the range finder. The sighting device is designed in such a manner that the observer can observe simultaneously the vertical position of the plumb rod 3 and a point aimed at in the field of view. The sighting device can be equipped with a sensor reacting to the magnetic field of the earth.

The range finder 2 is preferably tiltable about a horizontal axis H. The amount of the tilt rotation is detected by means of an angle generator or an electronic inclinometer a.

Furthermore, the plumb rod 3 is preferably designed so that it can be extended telescopically. At its lower end, it exhibits a conventional plumb rod tip S. Finally the plumb rod 3 can be provided with a length-measuring system, preferably a scale M, which permits a determination of the spacing h between the plumb rod tip S and the antenna center A.

Figure 2:
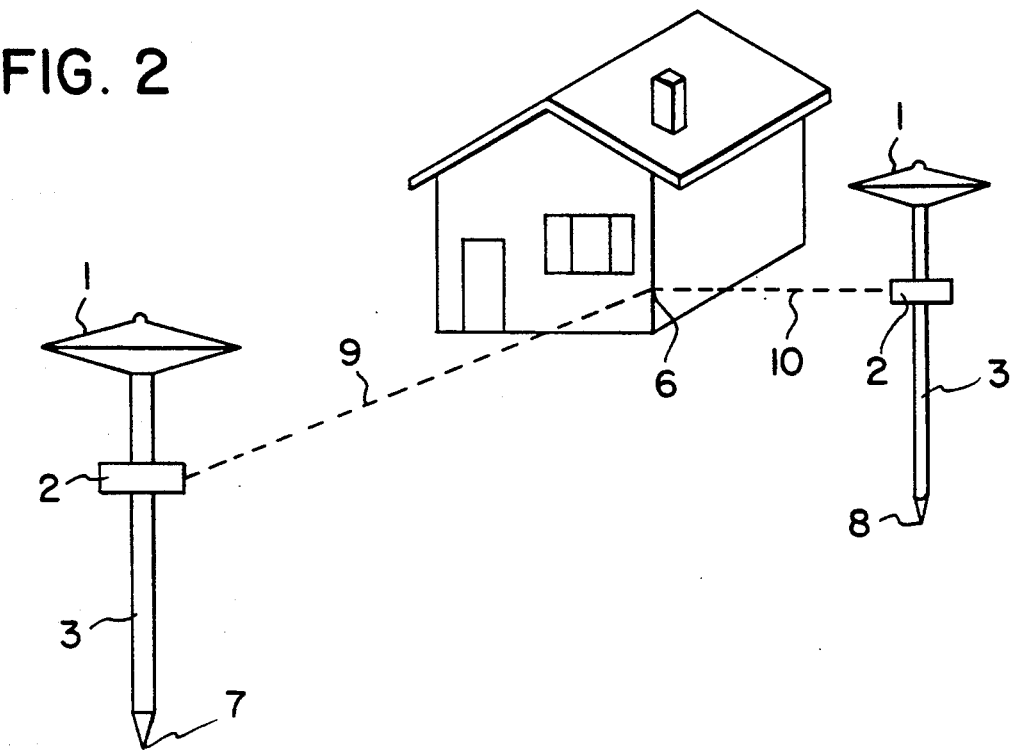
FIG. 2 shows an example of field measurement using at least one instrument according to FIG. 1, with two auxiliary measurement points which are situated in the reception range of a satellite position-measuring system.

The range finder 2 disposed, in the example, directly below the receiver 1 permits measurements of distances to remote points, e.g. to reflectors fitted thereon. In the example according to FIG. 2, point 6 represents such a remote point. However, range finding can also be undertaken in accordance with other non-contact methods without using a target reflector.

A point 6 to be surveyed is aimed at by the sighting device 5, at the same time the vertical setting of the instrument being monitored in the sighting device. For inclined lines of sight, the range finder 2 is tilted about the horizontal axis H, this rotation being detected by the angle generator or inclinometer a. Using this aid, the measured inclined distance is converted to the horizontal distance 9.

If the point 6 to be surveyed is not situated in the direct viewing range of the satellites, a measuring unit 1-5 is, for example, set up successively in the vicinity of the point 6 to be surveyed, for at least two different auxiliary points 7, 8 which can be reached by the satellite system. From these auxiliary points, the distances 9 and 10 to the point 6 which is inaccessible for the satellite system are determined electro-optically in the example. The coordinates of the point to be surveyed may then be determined unambiguously by means of an arc intersection method. If two measuring units are available, these are set up at the auxiliary points 7 and 8 respectively and the measurement is in other respects carried out in the described manner.

Figure 3:
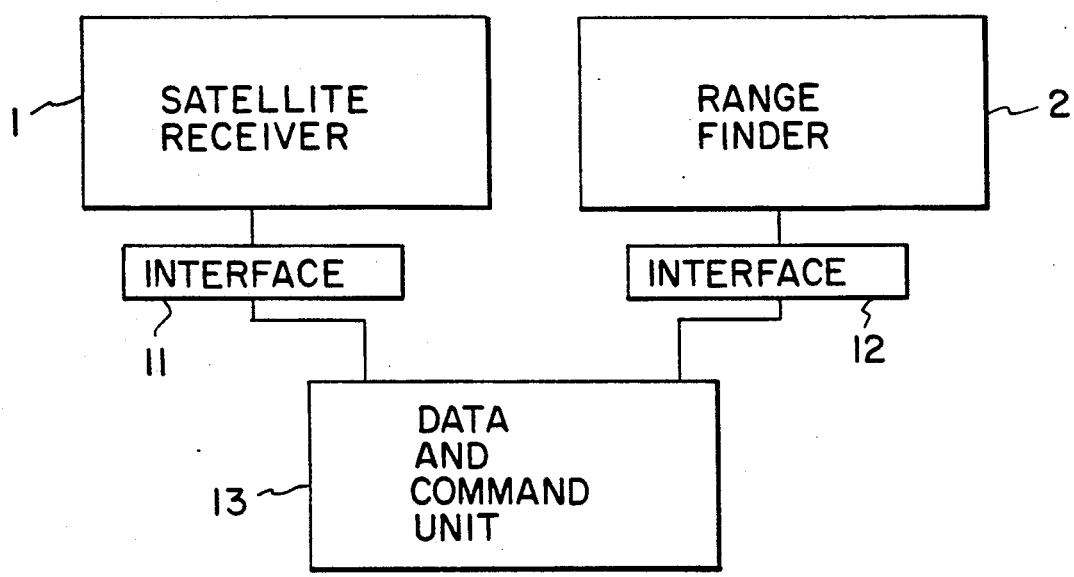
FIG. 3 shows the block diagram of the stages of the surveying instrument of FIG. 1.

FIG. 3 is a block diagram of the surveying instrument of FIG. 1. The satellite receiver 1 and the range finder 2 are connected by interfaces 11 and 12, respectively, to a data and command unit 13.

Using the described method, it is possible to support "quasi-kinematic" measurements, i.e. measurements which are completed in each instance in periods of a few seconds, by additional distance measurements geometrically, while the position of the measuring unit can be determined by means of reverse cutting methods.

I claim:

1. A measuring instrument for a satellite position measuring system, comprising:
   a satellite position measuring receiver;
   a contactless, inclinable range finder for geodetic determination of a target, said range finder including a sighting system for aiming at said target; and a plumb staff apparatus mounting said receiver and said range finder in common for locating said receiver and said range finder at a geometrical point, said plumb staff apparatus including a sensor for indicating a vertical position of said plumb staff apparatus.

2. A measuring instrument according to claim 1, wherein said plumb staff apparatus further includes:

a length measuring system for determining a distance between a tip of said plumb staff apparatus and a center of said receiver.

3. A measuring instrument according to claim 1 further comprising:

a data and command unit; and respective interfaces for coupling said receiver and said range finger to said data and command unit.

4. A method for determining a position of a target at a primary point not in a direct line of sight of a satellite by using a measuring instrument as defined in claim 1, comprising the steps of:

(a) positioning said measuring instrument at a first secondary point situated in a receiving range of said satellite;

(b) adjusting said instrument at said secondary point so that said sensor indicates said vertical position of said plumb staff apparatus;

(c) sighting said target with said sighting system;

(d) determining a first distance from said first secondary point to said primary point of said target;

(e) performing said steps (a) to (d) for at least a second secondary point to determine at least a second distance to said primary point of said target; and (f) employing said distances determined by steps (a) to (e) to mathematically determine said position of said target.

5. A method as in claim 4, wherein said step (e) is performed using only said instrument used for said steps (a) to (d).

6. A method as in claim 4, wherein said step (e) is performed using a separate instrument than that used to perform said steps (a) to (d) for the first secondary point.

7. A method as in claim 4, wherein said sighting step is performed by inclining said range finder about a horizontal axis for aiming said sighting system at said target.

* * * * *